Figure 1:
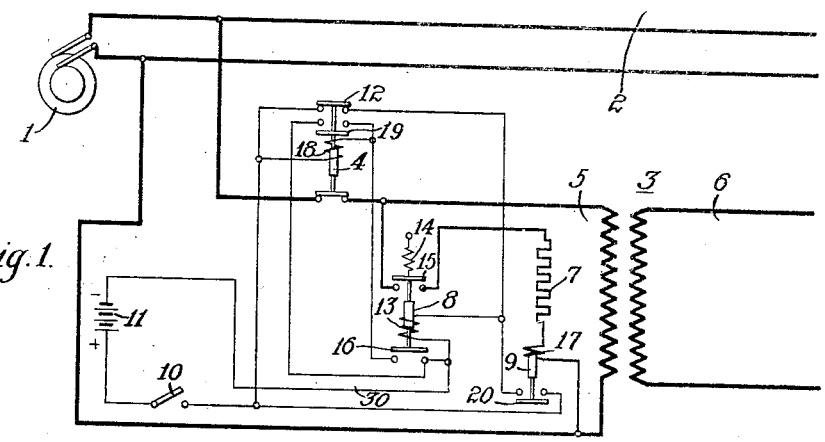

March 31, 1925.

R. E. HELLMUND 1,531,611

ELECTRICAL PROTECTIVE SYSTEM

Filed Nov. 12, 1920

WITNESSES:
H. J. Shelhamer
J. E. Foster

INVENTOR
Rudolf E. Hellmund
BY
Wesley G. Carr
ATTORNEY

Patented Mar. 31, 1925.

1,531,611

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE SYSTEM.

Application filed November 12, 1920. Serial No. 423,560.

*To all whom it may concern:*

Be it known that I, RUDOLF E. HELLMUND, a citizen of the United States, and a resident of Swissvale, in the county of Allegheny and State of Pennsylvania, have invented a new and useful Improvement in Electrical Protective Systems, of which the following is a specification.

My invention relates to electrical protective systems and particularly to systems employed for the protection of transformer windings.

One object of my invention is to provide means for preventing the generation of high voltages in transformer windings by the sudden surge or decrease of magnetizing current when the transformer is disconnected from a power circuit.

Another object of my invention is to provide automatic means, of the above indicated character, that shall absorb the electromagnetic energy of the transformer when it is disconnected from a power circuit.

Another object of my invention is to provide a method of, and a means for, automatically connecting an energy-absorbing means across the terminals of one winding of the transformer before the transformer is disconnected from the power circuit and then maintaining the energy-absorbing means connected to the terminals of the transformer winding until the electromagnetic energy stored therein has been dissipated.

Another object of my invention is to provide means of the above indicated character that shall be simple, automatic and reliable in its operation and that shall be initiated by the ordinary control switch that ordinarily effects the disconnection of the transformer from the circuit.

When a large power transformer is connected to a power circuit but does not have any load connected thereto the transformer draws only sufficient current to supply the magnetizing losses. This current, although small in value, tends to decrease so rapidly, when the transformer is disconnected from a power circuit, as to produce surges of extremely high voltages in the transformer windings. The voltages thus produced may, at times, be sufficient in value to puncture the insulation of the windings.

In order to avoid the above-mentioned condition, I provide a resistor that may be connected across the terminals of one winding of the transformer just before the transformer is disconnected from a power circuit. The electromotive force that is induced by the disappearing transformer flux causes a current to traverse the circuit, including the resistor and the transformer winding, that serves to prevent the transformer flux from disappearing quickly and thereby avoids any high-voltage surges that might injure the insulation of the winding. After the electromagnetic energy of the transformer has been absorbed or dissipated by the resistor, it is automatically disconnected from the transformer winding.

Figure 2:
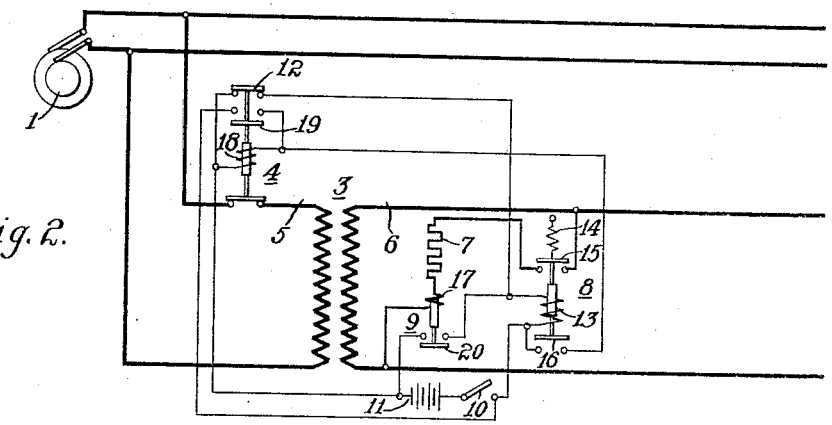
Figure 3:
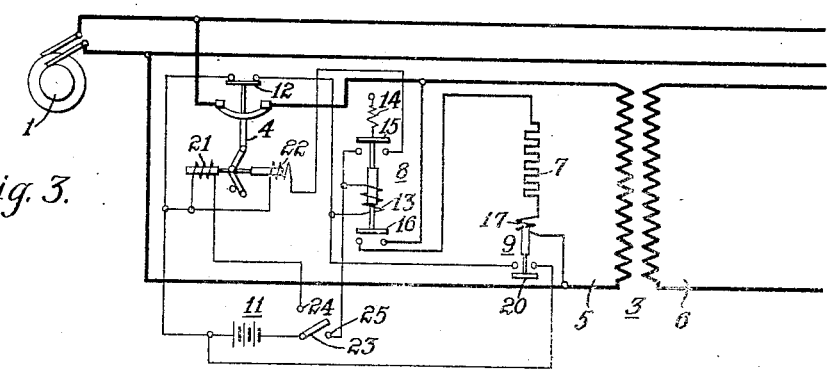

Figure 1 of the accompanying drawing is a diagrammatic view of an electrical circuit in which the energy-absorbing resistor is connected across the primary winding of the transformer;

Fig. 2 is a diagrammatic view of a similar circuit in which the energy-absorbing resistor is connected across the secondary winding of the transformer; and Fig. 3 is a diagrammatic view of a modified circuit similar to that illustrated in Fig. 1.

Corresponding elements of the various figures are similarly numbered in all figures.

Referring to Fig. 1, a source 1 of electromotive force is adapted to supply energy to a circuit 2 from which energy may be supplied to the transformer 3 through a circuit interrupter 4.

The transformer 3 comprises a primary winding 5 and a secondary winding 6. An energy-absorbing resistor 7 is adapted to be connected across the terminals of the primary winding 5 by means of a relay switch 8. An auxiliary relay 9 is provided to maintain the relay switch 8 in its energized position so long as current traverses the resistor 7 in excess of a predetermined value.

A manually operated control switch 10 and an auxiliary control circuit 11 are provided to initiate the control apparatus to disconnect the transformer 3 from the circuit 2.

When the transformer 3 is to be disconnected from the circuit 2, the switch 10 is closed and a circuit is completed thereby from the positive terminal of the circuit 11, through the switch 10, a switch 12 controlled by the interrupter 4, and the operating coil 13 of the relay 8, to the negative terminal of the control circuit 11 through a conductor 110

30. The coil 13 is thereupon energized, and the relay switch 8 is actuated against the force of a spring 14 to close two switching devices 15 and 16. The switching device 15 connects one terminal of the resistor 7 to one terminal of the transformer winding 5, the other terminal of the resistor 7 being connected through the operating coil 17 of the relay 9 to the other terminal of the transformer winding 5.

The closing of the switch 16, when the switch 15 is closed, completes a circuit from the positive terminal of the control circuit 11, through the switch 10, the operating coil 18 of the interrupter 4 and the switch 16, to the negative terminal of the control circuit 11 through the conductor 30.

When the switch 16 is closed, the coil 18 of the interrupter 4 is energized and the interrupter 4 is actuated to disconnect the winding 5 from the circuit 2. The interrupter 4, when actuated, simultaneously opens the switch 12 and closes a switch 19.

Immediately upon the actuation of the interrupter 4 to disconnect the winding 5 from the circuit 2, current is caused to traverse the circuit including the resistor 7 and the coil 17 of the relay 9, thereby actuating the relay 9 to close a switch 20. The switch 20 is connected in parallel relation to the switch 12 and serves, therefore, to maintain the operating coil 13 of the relay switch 8 energized in spite of the opening of the switch 12.

The switch 19, when closed, short-circuits the switch 16 and provides a holding-in circuit for the coil 18 of the interrupter 4, irrespective of the opening of the switch 16 after the relay 9 has become sufficiently deenergized to open the circuit of the coil 13 to permit the relay switch 8 to be returned to its initial position by the spring 14.

The current that has been caused to traverse the resistor 7, upon the disconnection of the winding 5 from the circuit 2, serves as a damping means to prevent a sudden decrease of the transformer flux. When the current decreases to a predetermined value, the relay 9 is released and the circuit of the holding coil 13 of the relay switch 8 is opened by the switch 20 of the relay 9.

The interrupter 4 is then maintained in its open position so long as the switch 10 is closed. When the transformer 3 is to be reconnected to the circuit 2, it is merely necessary to open the switch 10, whereupon the circuit of the holding coil 18 is opened and the interrupter is permitted to reconnect the transformer to the circuit 2.

In Fig. 2, the corresponding elements are employed, and similarly numbered, but the resistor 7 is connected across the terminals of the secondary winding 6 instead of across the terminals of the winding 5, as illustrated in Fig. 1. The circuits and the operation are the same as those explained above with reference to Fig. 1.

In Fig. 3, the various elements are similar to those illustrated in Figs. 1 and 2 except that the interrupter 4 is provided with a closing coil 21 and a trip coil 22. A double-pole switch 23 is employed, instead of the switch 10, to control the connecting and disconnecting, respectively, of the transformer 3 and the circuit 2.

The interrupter 4 is shown in its closed position and the circuit for energizing the closing coil 21 may be readily traced from the positive terminal of the control circuit 11 through the switch 23 and the contact member 24 and thence, through the closing coil 21, to the negative terminal of the control circuit 11.

To trip the interrupter, the switch 23 is closed to engage the contact member 25 and complete a circuit from the positive terminal of the control circuit 11 through the switch and the contact member 25, the operating coil 13 of the relay switch 8 and the switch 12 of the interrupter 4 to the negative terminal of the control circuit 11. The relay switch 8 is thereupon actuated and simultaneously closes the switches 15 and 16.

The switch 16 serves to connect the resistor 7 across the winding 5 of the transformer. The switch 15 completes a circuit that serves to energize the trip coil 22 of the interrupter 4 to trip the interrupter and thereby to disconnect the transformer from the circuit 2. Immediately upon the opening of the interrupter, a current is caused to traverse the circuit including the resistor 7 and the operating coil 17 of the relay 9, thereby energizing that coil to actuate the relay 9.

Upon the actuation of the relay 9, the switch 20 is closed. Since the switch 20 is connected in parallel relation to the switch 12, the energizing circuit of the coil 13 of the relay switch 8 is maintained closed. The relay switch 8 is thus maintained in its energized position until the switch 20 is opened by reason of a decrease in current through the resistor 7 to a predetermined value.

Although I have shown several modifications of the system embodying my invention, I do not wish to be limited to such modifications or to the specific devices that are illustrated, as further modifications may be made therein within the spirit and scope of the invention, as set forth by the appended claims.

I claim as my invention:

1. The combination with an electrical circuit and a transformer, of means for preventing surges in the system upon the disconnection of the transformer from the circuit, comprising energy-absorbing means and means controlled by the absorbed energy for controlling the operation of said means.

2. The combination with an electrical circuit and a transformer, of means for absorbing the electromagnetic energy of a transformer when it is disconnected from the circuit and means energized in accordance with such energy for controlling the absorbing means.

3. The combination with an electrical circuit and a transformer, of means for preventing the development of high-voltage surges in the secondary winding of the transformer upon the disconnection thereof from the circuit comprising a resistor, a switch for connecting the resistor across one winding of the transformer and means for controlling the switch until the energy is absorbed.

4. The combination with an electrical circuit and a transformer, of energy-absorbing means, means for connecting the same across the terminals of a winding of the transformer upon the disconnection thereof from the circuit and means for controlling the connecting means while the absorbing means is effective.

5. The combination with an electrical circuit and a transformer, of energy-absorbing means, means for connecting the same across the terminals of a winding of the transformer upon the disconnection thereof from the circuit and means for maintaining such connection until the magnetic energy has been absorbed.

6. The combination with an electrical circuit and a transformer, of an energy-absorbing means and means for connecting the same to the transformer winding upon the disconnection thereof from the circuit and for automatically maintaining the connection until the magnetic energy is absorbed.

7. The combination with an electrical circuit and a transformer, of a resistor, means for connecting the resistor across the terminals of one winding of the transformer and automatic means for maintaining the connecting means operative until the resulting current traversing the resistor decreases to a predetermined value.

8. The combination with an electrical circuit, a transformer and connecting means therefor, of a resistor, means for connecting the resistor across one winding of the transformer, means for actuating the resistor-connecting means and for controlling the disconnection of the transformer from the circuit, and means for automatically disconnecting the resistor after the absorption of the electromagnetic energy.

9. The combination with an electrical circuit, a transformer and connecting means therefor, of a resistor, means for connecting the resistor across one winding of the transformer, means for actuating the resistor-connecting means, means controlled thereby for disconnecting the transformer and means for automatically disconnecting the resistor.

10. The combination with an electrical circuit, a transformer and connecting means therefor, of a resistor, means for connecting the resistor across one winding of the transformer, means energized by the resulting current traversing the resistor for maintaining the connecting means operative until the electromagnetic energy is absorbed by the resistor.

11. The combination with an electrical circuit, a transformer and connecting means therefor, of a resistor, means for connecting the resistor across one winding of the transformer, means energized by the resulting current traversing the resistor for rendering the resistor-connecting means inoperative when the current decreases to a predetermined value.

12. The combination with an electrical circuit, a transformer and connecting means therefor, of a resistor, a manually operated control switch and automatic means initiated by the switch for connecting the resistor across one winding of the transformer, disconnecting the transformer from the circuit and disconnecting the resistor after the electromagnetic energy has been absorbed thereby.

13. The method of protecting transformer windings from high voltages induced therein upon the disconnection of the transformer from a supply circuit which consists in automatically connecting a resistor across one winding, when the transformer is to be disconnected, and maintaining the connection until the electromagnetic energy is dissipated in the resistor, after the transformer is disconnected.

In testimony whereof, I have hereunto subscribed my name this first day of November, 1920.

RUDOLF E. HELLMUND.